Jan. 12, 1971     R. J. BILLETT     3,554,846
FRICTION WELDING APPARATUS
Filed March 21, 1968     2 Sheets-Sheet 1
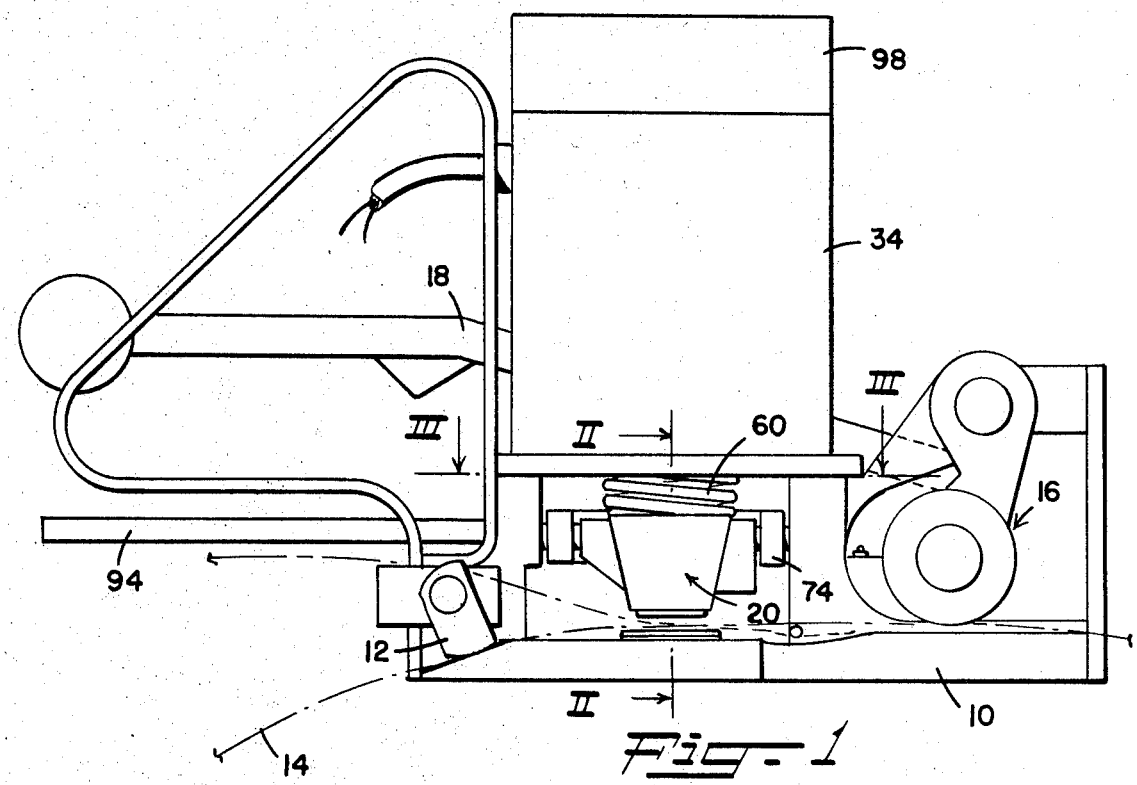
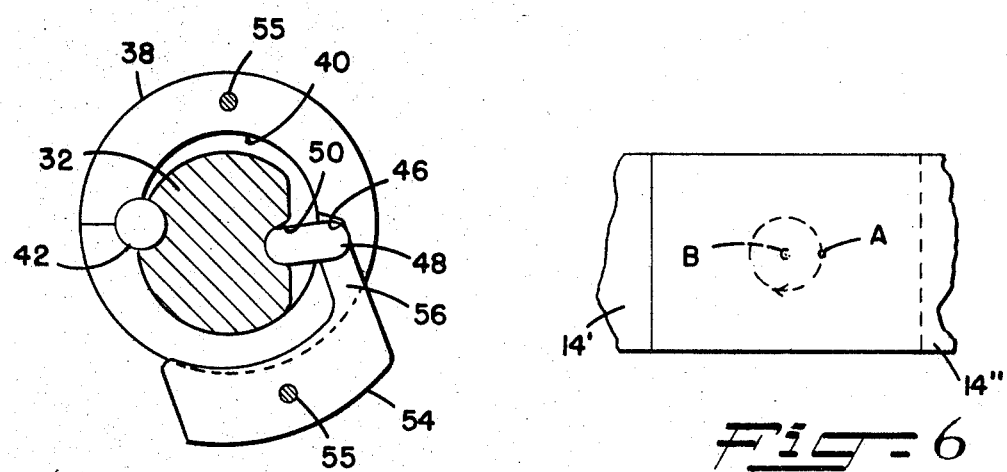

Jan. 12, 1971 R. J. BILLETT 3,554,846
FRICTION WELDING APPARATUS
Filed March 21, 1968 2 Sheets-Sheet 2

United States Patent Office 3,554,846
Patented Jan. 12, 1971

3,554,846
FRICTION WELDING APPARATUS
Ronald J. Billett, Sunnyvale, Calif., assignor to FMC Corporation, Philadelphia, Pa., a corporation of Delaware
Filed Mar. 21, 1968, Ser. No. 714,871
Int. Cl. B32b *31/20;* B29c *27/00*
U.S. Cl. 156—580
6 Claims

ABSTRACT OF THE DISCLOSURE

Apparatus for friction welding plastic articles and especially overlapping portions of plastic strapping comprises means for producing a relative rotary motion between the parts to be welded while they are pressed together. Provision is made for stopping the relative motion with the plastic parts oriented in the same relative positions at the end of the welding operation as at the beginning.

---

This invention relates to apparatus for friction welding plastic articles. In its more particular aspects, the invention relates to friction welding of plastic strapping and constitutes an improvement over the apparatus described in application Ser. No. 683,943, filed Nov. 17, 1967.

Securing plastic articles or pieces together by rubbing one against the other with sufficient pressure and speed to develop enough heat to slightly melt or soften the rubbed together areas and continuing to hold them together until they fuse is well-known, being commonly referred to as friction welding. Such method is described in an article entitled "Fabrication by Friction," appearing in the December 1945 issue of Plastics Magazine. Friction welding has been employed for, among other things, joining overlapping ends of plastic strapping. The term "plastic strapping" is employed to denote a high strength, molecularly oriented, polymeric strip used for binding boxes, bundles, bales and the like after the manner of steel band strapping. It is known that in heat sealing plastic strapping, whether the heat is produced by friction or otherwise, very rapid and shallow heating of the strap surface is highly desirable in order to avoid loss of molecular orientation and consequent loss of strength in the main body of the strap in the area of the joint. Heat causes loss of molecular orientation and by applying a high temperature for a brief time, the heat can be confined to an area near the surface whereas a lower temperature and a longer time causes the heat to migrate deeper into the strap. For this reason, friction welding of plastic strapping is a somewhat more critical or precise operation than friction welding of certain other plastic articles where molecular orientation is not involved.

A known apparatus for friction welding plastic strapping provides a reciprocating motion for rubbing one strap portion against another in a direction longitudinally of the strap. However, this method is not entirely satisfactory inasmuch as the inevitable stop and go action of the motion does not lend itself to heating the strap in the shortest possible time and, as mentioned above, rapid heating is essential to high joint strength. The above referred to application Ser. No. 683,943 describes an apparatus for friction welding of plastic strapping whereby one portion of the strap is rubbed against another with a continuous unidirectional orbital motion. This latter apparatus has the advantage of high speed but the orbital motion is an eccentric one and use of the apparatus can, although does not necessarily, result in a joint wherein the secured together strap portions are slightly out of alignment.

U.S. Pat. No. 3,062,295 discloses an apparatus for friction welding plastic articles by rubbing one against another with a continuous unidirectional orbital motion and said apparatus has provision whereby it may be operated in such a way that the two articles are sealed together in a predetermined alignment. However, the apparatus of this patent does not suggest or readily lend itself for use with plastic strapping.

It is an object of this invention to provide an improved apparatus for friction welding two plastic parts together in a predetermined alignment.

It is a further object of the invention to provide an improved friction welding apparatus which is especially useful for securing overlapping portions of plastic strapping in a predetermined longitudinal alignment.

Other and further objects, features and advantages of the invention as well as preferred means for attaining the same will become apparent as the detailed description thereof proceeds.

Referring now to the drawings:

FIG. 1 is a side elevational view of a strapping tool embodying the invention;

FIG. 5 is a view similar to FIG. 4 but showing the relatively movable parts in a second relative position; and FIG. 6 is a diagrammatic plan view of overlapping strap ends which will be used in describing the motion imparted to one of the ends.

Figure 3:
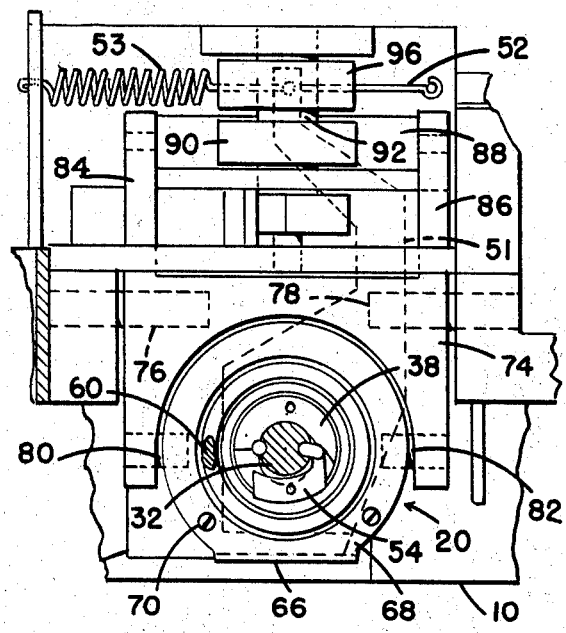
FIG. 3 is a sectional view taken along the line III—III of FIG. 1.

The invention is shown embodied in a tool comprising a base 10 adapted to rest upon the object about which the strapping is to be tensioned and secured. The various operating parts are secured either directly or indirectly to the base and include a dog 12 having a serrated edge adapted to cooperate with a portion of the base 10 to grip and hold one end portion of the plastic strapping 14. A tensioning mechanism indicated generally at 16 is operated by a lever 18 to act upon a portion of the strapping to draw the same tight about the object to be bound and provide overlapping strap portions beneath a sealing head indicated generally at 20. Means not shown is provided for cutting the tensioned strap from the supply adjacent and just to the left of sealing head 20 thus leaving two untensioned strap end portions in overlapping relationship beneath the sealing head. Except for the sealing head 20, the parts thus far referred to may be entirely conventional and therefore need not be described in detail.

Figure 2:
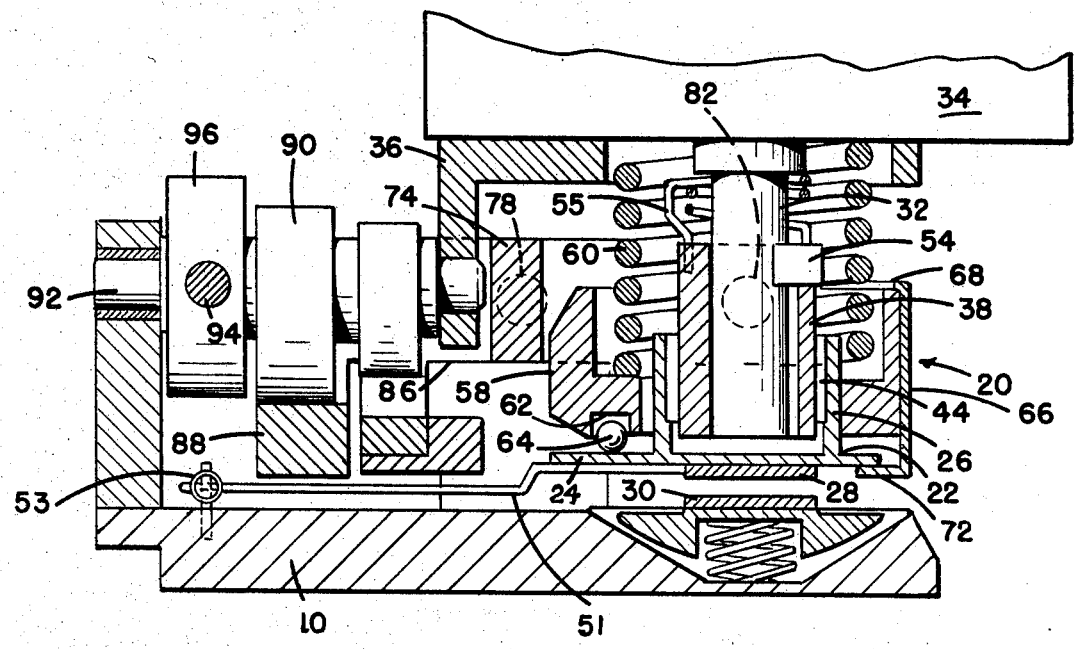
FIG. 2 is a sectional view taken along the line II—II of FIG. 1.

Referring particularly to FIG. 2, sealing head 20 comprises a device 22 having a flat bottom portion 24 and a cylindrical portion 26 extending upwardly from the central area of the bottom portion. Secured to the underside of portion 24 is a strap engaging means or pad 28 which is aligned directly above a similar pad 30 suitably mounted in or on base 10. The overlapping strap portions extend between pads 28 and 30 and, as will presently be explained, device 22 is movable up and down so as to squeeze the overlapping strapping portions between the two pads.

The cylindrical portion 26 of device 22 has extending thereinto the lower end of the drive shaft 32 of a suitable motor 34 which is mounted on a bracket 36 carried by base 10. Surrounding drive shaft 32 is a sleeve 38 having a cylindrical bore 40 (see FIGS. 4 and 5) of larger diameter than the drive shaft and a cylindrical outer periphery which is eccentric with respect to the bore. A pin 42 fits into a longitudinal recess in the drive shaft and a corresponding recess in the sleeve and serves as a hinge about which said sleeve may rock. Together, drive shaft 32 and sleeve 38 constitute, as will later be explained, a drive means for device 22. Anti-friction bearing means, for example a needle bearing 44, is mounted between sleeve 38 and the cylindrical portion 26 of the device 22.

At the upper end, approximately half of the circumference of sleeve 38 extends above the other half and one end of the upwardly extending part is notched as indicated at 46. A member 48 interposed between drive shaft 32 and sleeve 38 has a rounded end fitting into a groove 50 in the drive shaft and a second rounded end fitting into notch 46, whereby said member is articulated to the drive shaft and the sleeve. With member 48 in the position shown in FIG. 4, sleeve 38 is so positioned with respect to drive shaft 32 that the outer periphery of the sleeve is concentric with the drive shaft and the sleeve and drive shaft may then rotate freely within the cylindrical portion 26 of device 22 without effecting movement of said device. By shifting member 48 to the position shown in FIG. 5, sleeve 38 is rocked about the pin 42 so as to take up a position wherein the outer periphery thereof is eccentric with respect to the drive shaft. With the two parts of the drive means in this latter relative position, rotation of the drive means becomes effective to impart an orbital motion to device 22 with the center line of the drive shaft at the center of motion of the device.

Figure 4:
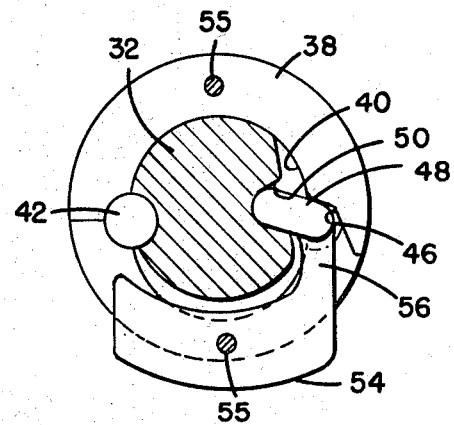
FIG. 4 is a vertical sectional view showing the relatively movable parts of the drive mechanism of the apparatus.

Means is provided to assure that device 22 remains stationary when sleeve 38 is in the FIG. 4 position and is not rotated about the axis of the sleeve and drive shaft due the inherent small friction between the sleeve and bearing 44 and between the bearing and cylindrical portion 26 of the device. This means comprises, as shown in FIGS. 2 and 3, a member 51 secured at one end to the bottom portion 26 of the device and at the other end said member has connected thereto a wire 52 and a spring 53. The wire and the spring are anchored to the framework of the tool and permit member 51 to have a limited amount of universal movement. Thus, the device 22 cannot itself rotate or revolve but can move with an orbital motion with the center line of drive shaft 32 at the center of motion.

For operating member 48 so as to locate sleeve 38 in either the FIG. 4 or FIG. 5 position, a weight 54 is either secured to the member or as shown is formed integrally therewith. According to a preferred form of the invention and as shown in the drawing, a torsion spring 55 loosely surrounds the upper portion of drive shaft 32 and has one end attached to weight 54 and the other end anchored to sleeve 38. Spring 55 normally holds weight 54 in the position shown in FIG. 4 whereby said weight holds member 48 rocked to the position wherein the bore 40 of sleeve 38 contacts the upper side (upper as viewed in FIGS. 4 and 5) of the drive shaft, in which position the outer periphery is concentric with the drive shaft, as aforesaid. When the drive means reaches a predeterminable speed, centrifugal force acting on weight 54 causes the weight to swing outwardly to the position shown in FIG. 5, further movement of the weight being prevented by contact of a portion 56 of the weight with one side of the notch 46. When the weight moves to the FIG. 5 position, the member 48 shifts sleeve 38 about pin 42 until the bore of the sleeve abuts the lower portion of the drive shaft and in this position the outer periphery of the sleeve, as noted, is eccentric with respect to the drive shaft and motion is imparted to the device 22. When rotation of the drive means falls below the speed effective to hold weight 54 in the FIG. 5 position, spring 55 returns the parts to the FIG. 4 position.

If desired, and this is within the purview of the invention, sleeve 38 may be shifted between its two positions relative to the drive shaft 32 by the force of inertia of the weight 54, rather than by centrifugal force. In this event, spring 55 is omitted and the drive shaft and sleeve are rotated in a clockwise direction. With sleeve 38 in the position shown in FIG. 4, the inertia of weight 54 causes it to lag behind upon rapid acceleration of the drive shaft and sleeve in a clockwise direction and this lagging behind of the weight rocks member 48 and shifts sleeve 38 to the FIG. 5 position. When now the rotation of the drive shaft and sleeve is discontinued, the inertia of the weight causes it to continue moving until it rocks member 48 and shifts the sleeve back to the FIG. 4 position. FIG. 4 may be considered the home or inactive position of sleeve 38 since it is in this position of the sleeve that no motion is imparted to the device 22. If it is desired to rely on the inertia of weight 54 to shift the sleeve from the inactive to the active position and back again, then of course the direction of rotation of the drive must be clockwise. When relying on the spring 55 and the centrifugal force on the weight, the drive can be in either direction.

As previously mentioned, device 22 is movable up and down to squeeze the overlapping strap portions between the strap engaging pads 28 and 30. This action will now be explained. Loosely surrounding the cylindrical portion 26 of the device is a collar member 58 and a heavy compression spring 60 has its lower end fitted within and bearing against said collar member. At its upper end, spring 60 bears against the bottom of motor 34. Located within sockets 62 provided in the bottom of collar member 58 is a series of steel balls 64 which engage the upper face of the flat bottom portion 24 of device 22. Only one ball 64 is shown in FIG. 2 but actually there is a series of them spaced about the center line of the cylindrical portion 26. A retainer 66 has an upper flange 68 secured to the upper edge of collar member 58 as by means of screws 70 and a lower flange 72 extending beneath an edge of the device 22 whereby said device is held in a position to retain the balls 64 in their sockets 62. Without the retainer, the cylindrical portion 26 of device 22 would slip down on or with the bearing 44 and permit the balls to escape.

A shifter member 74 is pivotally mounted on a pair of horizontal pins 76 and 78 carried by the framework of the tool. The shifter member has, as best seen in FIG. 3, a semicircular portion partially surrounding the collar member 58 and is articulated to the collar member by a pair of pins 80 and 82. A pair of arms 84 and 86 extend from the main body of the shifter member and a cam follower 88 is secured to the ends of said arms. Cam follower 88 underlies a cam 90 secured to a shaft 92 rotatably mounted in the framework. An operating lever 94 secured to a collar 96 fixed to shaft 92 is provided for rocking said shaft. With lever 94 in its normal position, a high portion of cam 90 holds follower 88 down to thereby hold shifter member 74 rocked about pins 76 and 78 so that collar member 58 is held upward against the action of spring 60. The collar member in turn, through the retainer 66, holds the device 22 elevated so as to space pad 28 sufficiently above pad 30 to loosely accommodate the overlapping strap portions therebetween.

After the strap has been tensioned by the tensioning mechanism 16, lever 92 is operated so as to rock shaft 92 and align a low portion of cam 90 with the follower 88, whereby spring 60 is permitted to move collar 58 downward. Since the only thing holding the device 22 in the position shown in FIG. 2 is the retainer 66, said device moves downward with the collar member, at first only under the force of gravity. Balls 64 are smaller in diameter than the distance between the closed ends of their sockets 62 and the top of portion 24 of the device 22 when the device is being supported by retainer 66 so that when pad 28 contacts the strap, collar member 58 continues its downward movement to force the closed ends of the sockets 62 against the balls 64 whereby the force of spring 60 is able to act against device 22 and press the overlapping ends of the strap together. With balls 64 squeezed tightly between the collar member 58 and the portion 24 of device 22, the bottom of portion 24 is no longer in contact with the underlying flange 72 of the retainer and said device becomes free to partake of its orbital movement as aforesaid. Before the strap portions are squeezed together, or at least before orbital movement is imparted to device 22, the upper strap portion is severed from the supply so that it is free to move with the device.

Pads 28 and 30 are made of such material or are so constructed that resistance to movement between the pads and the strap portions engaged thereby is greater than the resistance to relative movement between the pressed together faces of strap. It could be said that the pads grip the strap. Thus, with the overlapping strap portions squeezed between the pads, orbital movement of the device 22 and pad 28 connected thereto results in similar movement of the upper strap portion while the lower strap portion remains stationary. Referring to FIG. 6, the lower strap portion engaged with pad 30 is indicated at 14′ and the upper strap portion engaged with pad 28 is indicated at 14″. At the time the portions 14′ and 14″ are squeezed together they are in the relationship that it is desired for them to be in at the end of the sealing operation. At this time also motor 34 is not in operation and the two parts of the drive means (drive shaft 32 and sleeve 38) are in the relative positions shown in FIG. 4 with the outer periphery of sleeve 38 concentric with the center line of the drive shaft. Now the motor is started in any desired manner and in the case where the inertia of weight 54 is relied upon to shift sleeve 38 to the FIG. 5 position said sleeve is immediately so shifted. In the case where centrifugal force is employed for shifting the weight and sleeve, the sleeve does not shift until the motor reaches a particular speed. In any event, with the two parts of the drive means in the relative position shown in FIG. 4, sleeve 38 can rotate freely within the bearing 44 without imparting motion to the device 22 and the two portions 14′ and 14″ of the strap remain stationary in the desired alignment. When sleeve 38 shifts to the FIG. 5 position, rotation of the drive means imparts an orbital motion to device 22 as previously explained and this in turn causes the upper strap portion 14″ to move with respect to the lower strap portion in such manner that a point A on the center line of strap portion 14″ revolves or orbits about a point B on the center line of the lower strap portion. This, of course, causes all other incrementally spaced points on strap portion 14″ to orbit about correspondingly incrementally spaced points on strap portion 14′ with the result that sufficient heat is frictionally produced to soften the facing areas of the strap. When motor 34 is slowed below a predetermined speed in the case of centrifugal operation of weight 54 or is rapidly decelerated in the case of inertial operation of the weight, sleeve 38 is moved back to the FIG. 4 position whereby no further movement is imparted to strap portion 14″ and said strap portion is then in its original position relative to strap portion 14′. Very shortly after motion of strap portion 14″ ceases, the softened facing areas of the strap become fused together to form a highly efficient joint. If desired, a timing mechanism, the casing of which is indicated at 98 (see FIG. 1), may be provided to discontinue operation of motor 34 in a certain time after the motor is started.

Having thus described preferred embodiments of the invention, what is claimed is:

1. Apparatus for friction welding two plastic parts together in predetermined alignment comprising means for pressing the plastic parts together in the desired predetermined alignment, said means including a device for gripping one of the plastic parts and rubbing it against the other, rotatable drive means for said device, said drive means comprising a pair of relatively movable parts which in a first relative position hold said device and the plastic part gripped thereby in the desired predetermined alignment and in a second relative position effect movement of said device to rub the plastic part gripped thereby against the other plastic part, and means operating in response to rotation of said drive means for shifting the relatively movable parts of the drive means from said first relative position to said second relative position.

2. The apparatus set forth in claim 1 comprising means normally holding the relatively movable parts of the drive means in said first relative position, and means connected to said drive means and operated by centrifugal force for shifting the relatively movable parts of the drive means to said second relative position during rotation of said drive means.

3. The apparatus set forth in claim 1 wherein said last mentioned means comprises an operating element articulated to the relatively movable parts of said drive means, and weight means associated with said element.

4. The apparatus set forth in claim 3 wherein said weight means is so associated with said operating element that the inertia of the weight means causes the operating element to shift the relatively movable part of the drive means to said second relative position when said drive means starts to rotate and to shift said relatively movable parts back to the first relative position when said drive means stops.

5. Apparatus for friction welding two plastic parts together in predetermined alignment comprising a device for pressing the plastic parts together in the desired alignment, said device comprising a first portion adapted to grip one of the plastic parts and a second portion having a cylindrical bore extending at right angles to the first portion, a drive mechanism extending into said cylindrical bore, said drive mechanism comprising a drive shaft and a sleeve drivingly connected to the drive shaft, said sleeve having a cylindrical periphery separated from the cylindrical bore of said device by anti-friction bearing means, said sleeve being shiftable radially of said drive shaft from a first position wherein the cylindrical periphery thereof is concentric with the drive shaft so that rotation of the drive shaft causes the sleeve to rotate freely within the cylindrical bore of said device without imparting motion to said device and a second position wherein the periphery of the sleeve is eccentric with the drive shaft whereby rotation of the drive shaft and sleeve imparts an orbital motion to said device with the center line of the drive shaft at the center of motion of said device.

6. The apparatus set forth in claim 5 comprising resilient means normally holding said sleeve in said first position, and centrifugally operated means associated with said drive shaft and said sleeve for shifting said sleeve to said second position when said drive shaft reaches a predetermined speed.

References Cited

UNITED STATES PATENTS 3,442,733  5/1969  Uilcins _____ 156—580

BENJAMIN A. BORCHELT, Primary Examiner

J. J. DEVITT, Assistant Examiner

U.S. Cl. X.R.

156—73